Jan. 1, 1924
J. SLEPIAN
COMMUTATOR MOTOR
Filed Oct. 6, 1919
1,479,160
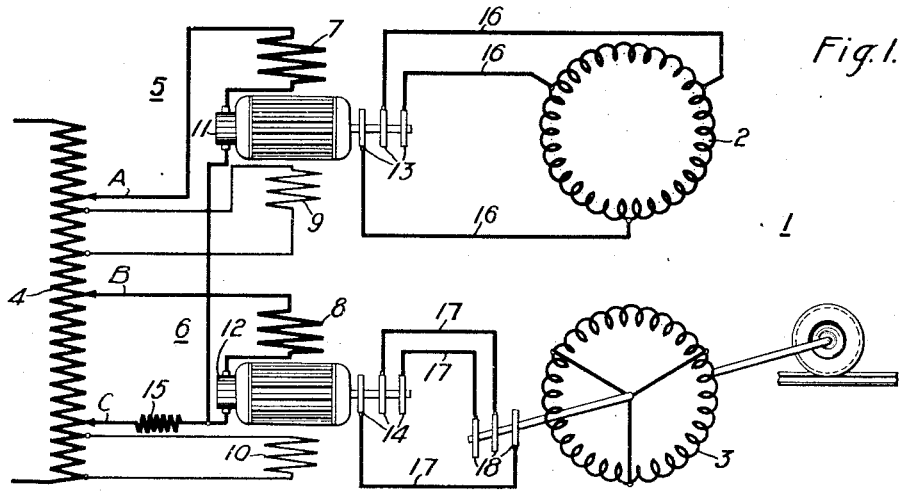
Fig. 1.
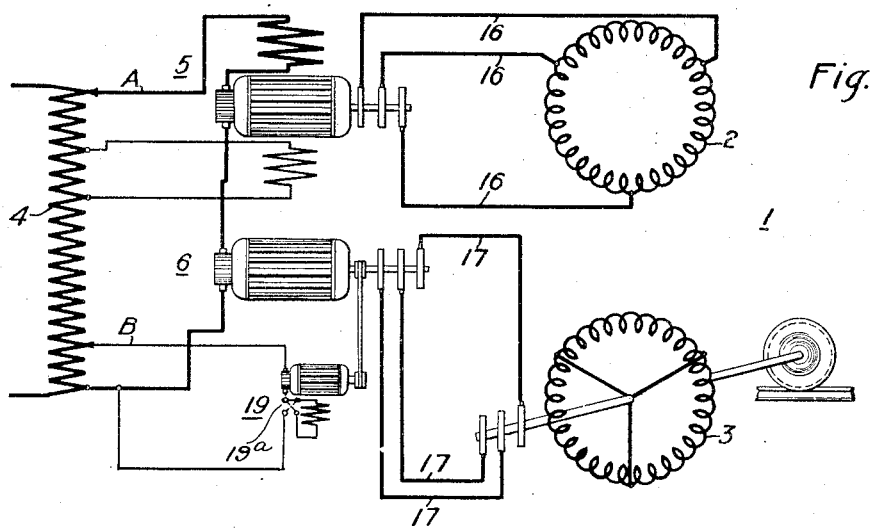
Fig. 2.
Fig. 3.
WITNESSES:
J. A. Helsel
O. A. Brand
INVENTOR
Joseph Slepian
BY
Wesley G. Carr
ATTORNEY Patented Jan. 1, 1924.

1,479,160

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

COMMUTATOR MOTOR.

Application filed October 6, 1919. Serial No. 328,808.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Commutator Motors, of which the following is a specification.

My invention relates to commutator motors, particularly to machines of the character designated which are to be accelerated slowly, and it has for its object to provide means whereby good commutation may be obtained throughout the entire acceleration range of the machine.

For a better understanding of my invention, reference may be had to the accompanying drawing in which Figure 1 is a diagrammatic view of the machines and the connections used in my commutator-motor construction; Fig. 2 is an illustration of another system embodying my invention, and Fig. 3 is a diagrammatic chart showing the manner in which the various machine elements are accelerated.

In my copending application, Serial No. 316,171 filed August 8, 1919, I have illustrated and claimed a system wherein the auxiliary dynamo-electric machines, which are associated with the main dynamo-electric machine in my system, are provided with exciting field windings which are connected in shunt relationship. I find, however, that, in some instances, it may be desirable to use auxiliary machines which are provided with series-connected field windings, and, in investigating this latter system, I have discovered that certain novel connections, which I will hereinafter describe and claim, are desirable.

Referring now more particularly to Fig. 1, a dynamo-electric machine 1 is provided with a primary member 2 and a secondary member 3, the latter being shown as rigidly connected to a load. A source of energy, here represented as a secondary member 4 of a transformer, is utilized to supply energy to the primary and secondary members of the machine 1.

Between the machine 1, and the source of supply 4 are placed two auxiliary dynamo-electric machines, 5 and 6, provided with series-connected accelerating field windings 7 and 8, respectively, commutating-pole windings 9 and 10, respectively, commutators 11 and 12, respectively, and slip rings 13 and 14, respectively. It will be observed that the main field windings 7 and 8 are connected in series relationship and that, therefore, the two auxiliary machines have all of the characteristics inherent in series-connected dynamo-electric machines. An inductive device 15 is inserted in the common lead of the two machines, for purposes hereinafter more fully described. The power which enters the machine 5 from the source 4, is fed therefrom, through mains 16, to the primary member 2 of the machine 1, and the power entering the machine 6 is fed therefrom through mains 17 into slip rings 18 associated with the secondary member 3.

As more fully described and claimed in my above-mentioned copending application, the machine 1 may, through the instrumentality of the above-described auxiliary machines and connections, be accelerated at a comparatively low rate of speed, even though the auxiliary machines with which the commutators, functioning in the system, are mechanically connected, are operated at comparatively high rates of speed. As described in that application, the machines 5 and 6, if operated at equal speeds, are instrumental in furnishing currents of the same frequency to both the primary and secondary members of the main machine and, therefore, the latter will not accelerate, since its speed is dependent upon the difference of the auxiliary machine speeds.

However, in the system with which the present application is concerned, the auxiliary machines are provided with series-connected field windings, and, therefore, if they are operated in such manner that their speeds are equal, and, consequently, that the main or torque machine 1 is stationary, it is evident that they will function in exactly the same manner as a series-excited commutator machine, running under no load; that is to say, they will develop very excessive and dangerous speeds.

In considering the functions of the auxiliary machines, when provided with series field windings and comprising frequency-changing paths for the power furnished to the primary and secondary members of the torque machine, the following observations are pertinent. For the purposes of this discussion, I have designated the leads furnishing power to the commutator machines as A, B and C, the machine 5 being connected to the source 4 through the leads A and C, and the machine 6 being so connected through the leads B and C.

The currents which flow through the brushes of the two auxiliary machines may be divided into two parts. One part is cancelled in the armatures of the commutator machines by the currents drawn from the slip rings thereof by the torque-machine primary and secondary members. The remaining part of the currents drawn in through the brushes is uncancelled in the armatures thereof, and, consequently, produces accelerating torque on these armatures. It should be noted, however, that both portions of these currents flow through the series-connected fields of the auxiliary machines.

At standstill of the torque machine, the currents which flow from the slip rings are determined entirely by the voltage between leads A and B and leads B and C. These currents are, of course, equal and opposite because the two members of the main torque machine 1 function in exactly the same manner as a static transformer, in which the primary and secondary are substantially equal and opposite, the ordinary transformer magnetizing current furnishing the only reason for a discrepancy between the two currents. The corresponding parts of the brush currents are likewise equal and opposite, and, therefore, the corresponding components of these latter currents cancel in the common lead C.

The remaining components of the brush currents, that is, those that produce acceleration of the commutator machines, do not cancel in the common lead C. In one of the machines they strengthen the field produced by the torque-machine currents, and in the other machine they weaken the field. In order that they shall not actually reverse the field of the latter machine, I have provided the afore-described resistance or reactance member 15 in the common lead C.

The two commutator machines accelerate rapidly to such a speed as to reduce to zero the components of the armature currents which are uncancelled by the currents drawn from the slip rings. The existing fields, because of the currents drawn by the slip rings, are not reduced to zero as would be the case in ordinary series commutating machines, and, therefore, the commutator machines, although not mechanically connected to their loads, are so electrically intermeshed therewith, that, as long as the torque machine requires power to run, there is no tendency for the auxiliary commutator machines to function as unloaded series-excited machines.

The algebraic difference between the speeds of the two auxiliary commutator machines is determined by the speed of the torque machine, due to the heretofore mentioned transformer action between the two members of the latter machine, their actual speeds being determined by the currents drawn by the torque machine. The acceleration steps by which the heretofore described main torque machine may be brought up to the various running speeds, are substantially the same as those which I have more fully described and claimed in the above-mentioned copending application, it being only necessary to so vary the speeeds of the two machines as to eventuate an algebraic difference which shall be equal to the torque machine speed, although I find that it may be desirable to initially determine a small algebraic difference between the speeds of the two auxiliary machines during their acceleration to a speed in excess of that at which commutation difficulties are present.

In the heretofore-described machine aggregate, I have assumed that a constant mechanical load is connected to the torque machine. Inasmuch as I find particular use for my invention in connection with railway vehicles, provision should be made whereby the system will continue to function in a desirable manner, even though the mechanical load momentarily is withdrawn from the torque machine. Such a situation would arise, for instance, when an electrical locomotive in which my invention is embodied, is coasting down-hill. I find, moreover, that certain additional changes should be made in the fundamental system above-described, in order to insure desirable operation during regeneration or dynamic braking.

The system shown in Fig. 2 is one embodying my invention, and which I find is particularly applicable for regenerative braking and for operation in which the speeds of the commutator machines, although the latter are series-excited, are rendered independent of the currents drawn from the slip rings by the torque machine.

It will be observed that the machine 6 is no longer provided with an accelerating field winding, and, moreover, that the two auxiliary machines are connected in series. A small auxiliary machine 19 is energized from the source 4 and is belted to the machine 6, whereby the speed of the latter may be governed independently of the speed of the torque machine. It will be understood that the machine 19 is capable of reverse rotation, and any means, such as a switch 19$^a$ for changing the direction of field excitation, may be employed for this purpose.

Inasmuch as the speed of the machine 6 may be independently determined, it is apparent that the other commutator machine will automatically assume such a speed that the algebraic difference of the auxiliary-machine speeds will be equal to the speed of the torque machine 1, and, moreover, it should be understood that the speed of the torque machine is determined partly by the mechanical load applied thereto and partly by the voltage AB.

To illustrate the manner in which the system shown in Fig. 2 functions, reference should be had to Fig. 3 which is a simplified diagrammatic chart of the interrelation between the speeds of the various machine elements embodying my invention, the horizontal lines representing various positions in the accelerating range, while the distances along these lines, such as XY and YZ, represent the full speed of the machine 6 and the machine 7, respectively, in opposite directions. Let us assume, that good commutation can be effected at one-third full speed of the commutator machines and thereabove.

The voltage AB is initially made small and the machine 6, which I will hereinafter designate as the fieldless machine, the machine 5 being designated as the fielded machine, is driven at one-third of its full speed. Since provision has been made whereby the speeds of the two commutator machines may be equal and yet not become dangerous, the initial speed of the machine 6 will then become stabilized at one-third of its full speed. Upon raising the voltage applied, the torque motor starts, and, as it gains speed with the increasing voltage, the fielded commutator machine also increases in speed. When the torque motor reaches one-third of its full speed the fielded commutator machine will have reached full speed, as may be understood from a consideration of the condition shown in position 2 of Fig. 3, since the algebraic difference between a torque machine speed equal to one-third full speed and a speed of one-third full speed existing in the fieldless commutator machine, is equal to full speed of the fielded commutator machine. In other words, the desirable conditions which I have heretofore pointed out as obtainable with systems of the character herein described, as well as those described in the above-mentioned copending application, have been attained as regards a slow acceleration of the main machine with a very rapid acceleration of the auxiliary machines, even though the auxiliary machines have series-field-excitation characteristics which would ultimately cause them to get beyond control when their speeds should become equal if no restraining means were utilized.

The next step in the acceleration sequence, which I have here adopted for purposes of illustration, is the reversal in direction of the fieldless machine by any suitable reversing means of the driving motor thereof, and its subsequent acceleration to one-third of its full speed in a direction opposite to that in which it had been running. At the same time, the speed of the fielded machine is reduced to one-third full speed in the same direction as that in which it had been running. The result is that the torque-machine speed is maintained constant at one-third of its full speed, as will be observed by reference to position 3 of Fig. 3.

The voltage is then raised gradually to its full value, the fieldless machine, at the same time, being gradually accelerated to its own full speed, and the changes in the torque-machine speed will be made as shown in the higher-numbered acceleration positions in Fig. 3. It will be observed, therefore, that the main machine has been gradually accelerated to its full speed, and that, if need be, it can be run at a very low rate of acceleration, even though the auxiliary machines themselves and the ones in which any commutator difficulties will be experienced, are operated at a speed just above that at which those commutation difficulties are apparent.

While I have shown but two embodiments of my invention for utilizing auxiliary commutator machines provided with series-excited field windings, it is apparent that many modifications of these systems may occur to those skilled in the art, and I desire, therefore, that my invention shall be limited only by the prior art or as specifically set forth in the appended claims.

I claim as my invention:

1. A dynamo-electric machine comprising primary and secondary members, and auxiliary single-phase dynamo-electric machines electrically associated therewith to furnish currents conductively to each of said members, the frequency of said currents being dependent upon the speeds of said auxiliary machines, at least one of said currents being polyphase currents of such nature as to produce a rotating alternating field, series exciting windings for at least one of said auxiliary machines, and means for varying the speeds of said auxiliary machines, the algebraic difference in the speeds of said auxiliary machines determining the absolute speed of said first-named dynamo-electric machine.

2. A dynamo-electric machine comprising primary and secondary members, auxiliary machines electrically associated therewith to furnish currents conductively to each of said members, the frequency of said currents being dependent upon the speeds of said auxiliary machines, at least one of said currents being polyphase currents of such nature as to produce a rotating alternating field, series exciting windings for at least one of said auxiliary machines, means for varying the speeds of said auxiliary machines, the algebraic difference in the speeds of said auxiliary machines determining the absolute speed of said first-named dynamo-electric machine, and means for preventing said auxiliary machines from exceeding a certain predetermined speed when their speeds are equal.

3. A dynamo-electric machine comprising primary and secondary members, auxiliary machines electrically associated therewith to furnish currents conductively to each of said members, the frequency of said currents being dependent upon the speeds of said auxiliary machines, series exciting windings for at least one of said auxiliary machines, means for varying the speeds of said auxiliary machines, the algebraic difference in the speeds of said auxiliary machines determining the absolute speed of said first-named dynamo-electric machine, and means associated with one of said auxiliary machines to prevent its exceeding a predetermined speed when running under no-load conditions.

4. A dynamo-electric machine comprising primary and secondary members, auxiliary dynamo-electric machines electrically associated therewith to furnish currents conductively to each of said members, the frequency of said currents being dependent upon the speeds of said auxiliary machines, series exciting windings for at least one of said auxiliary machines, means for varying the speeds of said auxiliary machines, the algebraic difference in the speeds of said auxiliary machines determining the absolute speed of said first-named dynamo-electric machine, and substantially equal and opposite currents being drawn by said members through the auxiliary machines, and means in the circuit of said auxiliary machines to prevent a reversal of the direction of rotation of one of the machines.

5. In combination with a source of energy, a dynamo-electric machine comprising primary and secondary members, auxiliary dynamo-electric machines connected with, and supplying substantially equal and opposite currents of varying frequencies to said primary and secondary members, series exciting windings for at least one of said auxiliary machines, connections between said source and the auxiliary machines, one of said connections being common to both machines, and means in said last-named connection for preventing a reversal of the direction of rotation of one of the auxiliary machines.

6. A dynamo-electric machine comprising primary and secondary members, auxiliary machines electrically associated therewith to furnish substantially equal and opposite currents conductively to said members, one of said machines being series excited and the other machine being unprovided with an accelerating field winding, and means for independently governing the speed of said last-named machine.

7. A dynamo-electric machine comprising primary and secondary members, series-connected auxiliary machines electrically associated therewith to furnish substantially equal and opposite currents conductively to said members, one of said machines being series excited and the other machine being unprovided with an accelerating field winding, and means for independently governing the speed of said last-named machine.

8. The method of operating a dynamo-electric machine comprising primary and secondary members, each conductively supplied with power from auxiliary machines electrically associated therewith, the latter being energized from a variable source of electromotive force, which comprises running one of the auxiliary machines at a predetermined speed, irrespective of the voltage applied thereto, and feeding one member of the main dynamo-electric machine therefrom, the speed of the other auxiliary machine being determined by the magnetic action between the primary and secondary members of the main dynamo-electric machine.

9. The method of operating a dynamo-electric machine comprising primary and secondary members each conductively supplied with power from series-connected auxiliary machines electrically associated therewith, the latter being energized from a variable source of electromotive force, which comprises running one of the auxiliary machines at a predetermined speed, irrespective of the voltage applied thereto, and feeding one member of the main dynamo-electric machine therefrom, the speed of the other auxiliary machine being determined by the magnetic action between the primary and secondary members of the main dynamo-electric machine, and then varying the voltage applied to said auxiliary machines, while maintaining the speed of one of the auxiliary machines constant, whereby the speed of the main dynamo-electric machine is increased.

10. The method of operating a dynamo-electric machine comprising primary and secondary members each conductively supplied with power from series-connected auxiliary machines electrically associated therewith, the latter being energized from a variable source of electromotive force, which comprises running one of the auxiliary machines at a predetermined speed, irrespective of the voltage applied thereto, while feeding one member of the main dynamo-electric machine therefrom, the speed of the other auxiliary machine being determined by the magnetic action between the primary and secondary members of the main dynamo-electric machine, then varying the voltage applied to said auxiliary machines, while maintaining the speed of one of the auxiliary machines constant, whereby the speed of the main dynamo-electric machine is increased, and then reducing the speed of the last-named auxiliary machine to zero and reversing its direction of rotation at the same time that the speed of the other auxiliary machine is reduced, the speed of the main dynamo-electric machine remaining constant during the latter adjustment of the auxiliary dynamo-electric machines.

11. The method of operating a dynamo-electric machine comprising primary and secondary members each conductively supplied with power from series-connected auxiliary machines electrically associated therewith, the latter being energized from a variable source of electromotive force, which comprises running one of the auxiliary machines at a predetermined speed, irrespective of the voltage applied thereto, while feeding one member of the main dynamo-electric machine therefrom, the speed of the other auxiliary machine being determined by the magnetic action between the primary and secondary members of the main dynamo-electric machine being determined by the magnetic action between the primary and secondary members of the main dynamo-electric machine, then varying the voltage applied to said auxiliary machines while maintaining the speed of one of the auxiliary machines constant, whereby the speed of the main dynamo-electric machine is increased, then reducing the speed of the last-named auxiliary machine to zero and reversing its direction of rotation at the same time that the speed of the other auxiliary machine is reduced, the speed of the main dynamo-electric machine remaining constant during the latter adjustment of the auxiliary dynamo-electric machines, and finally running the independently-regulated machine at full speed and applying full voltage to the series-connected auxiliary machines, whereby the main machine is operated at full speed.

In testimony whereof, I have hereunto subscribed my name this 30th day of Sept. 1919.

JOSEPH SLEPIAN.